Dec. 23, 1958   R. KRESS   2,865,165
VARIABLE NOZZLE FOR JET ENGINE
Filed March 17, 1950   10 Sheets-Sheet 1
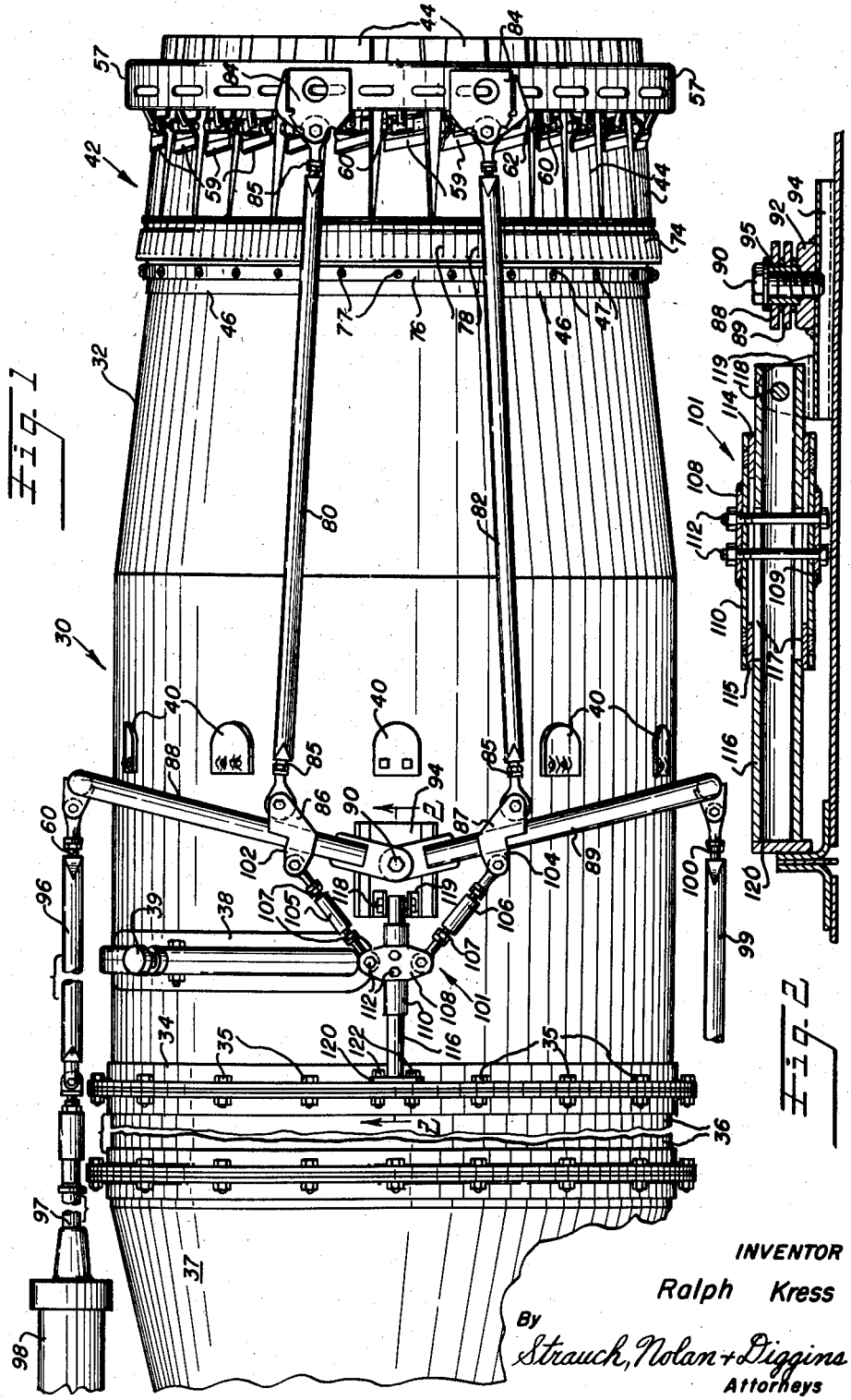
INVENTOR
Ralph Kress
By
Strauch, Nolan + Diggins
Attorneys

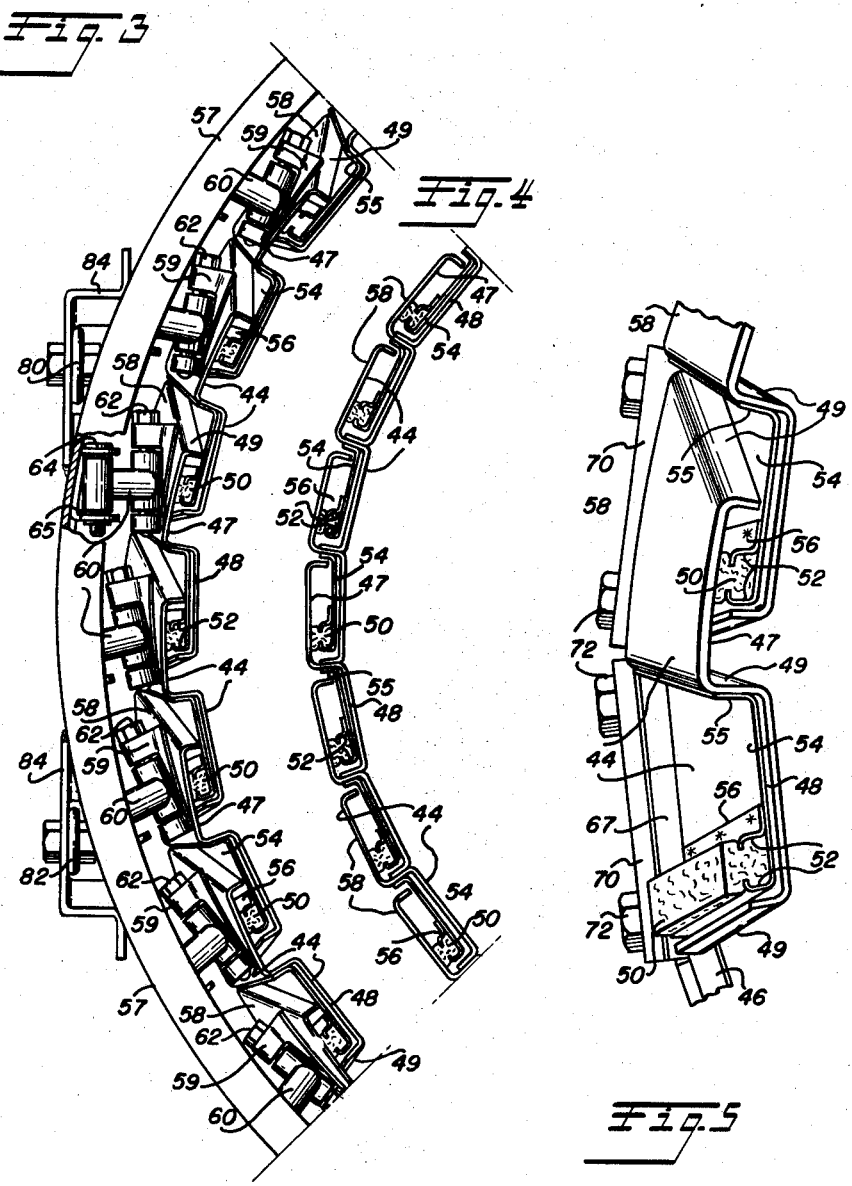

Dec. 23, 1958 R. KRESS 2,865,165
VARIABLE NOZZLE FOR JET ENGINE
Filed March 17, 1950 10 Sheets-Sheet 3
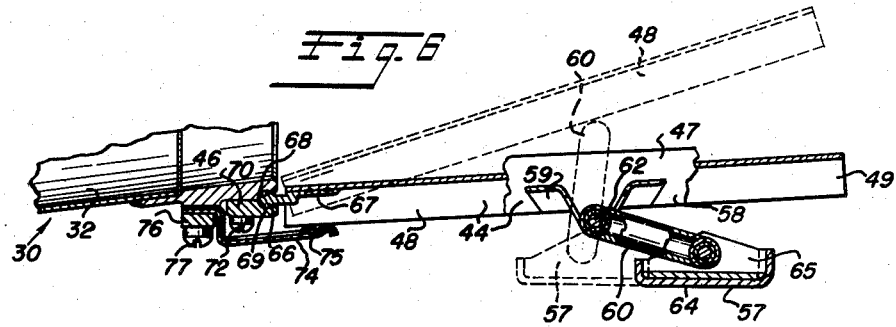
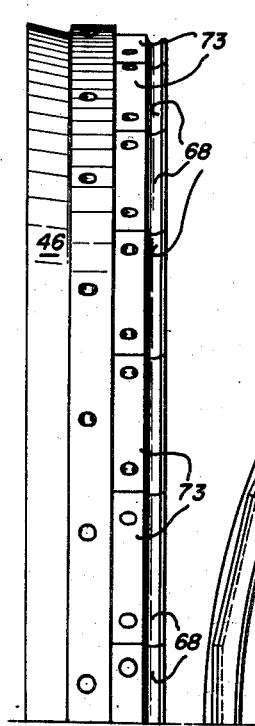
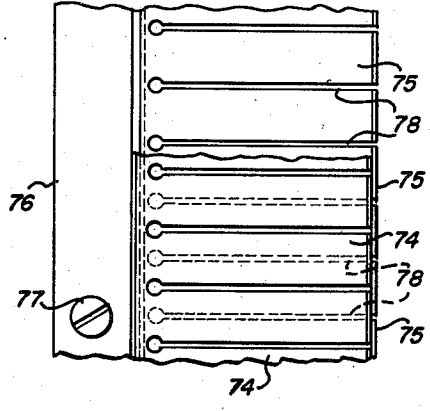
INVENTOR
Ralph Kress
BY Strauch, Nolan & Diggins
ATTORNEYS Dec. 23, 1958  R. KRESS  2,865,165
VARIABLE NOZZLE FOR JET ENGINE
Filed March 17, 1950  10 Sheets-Sheet 4
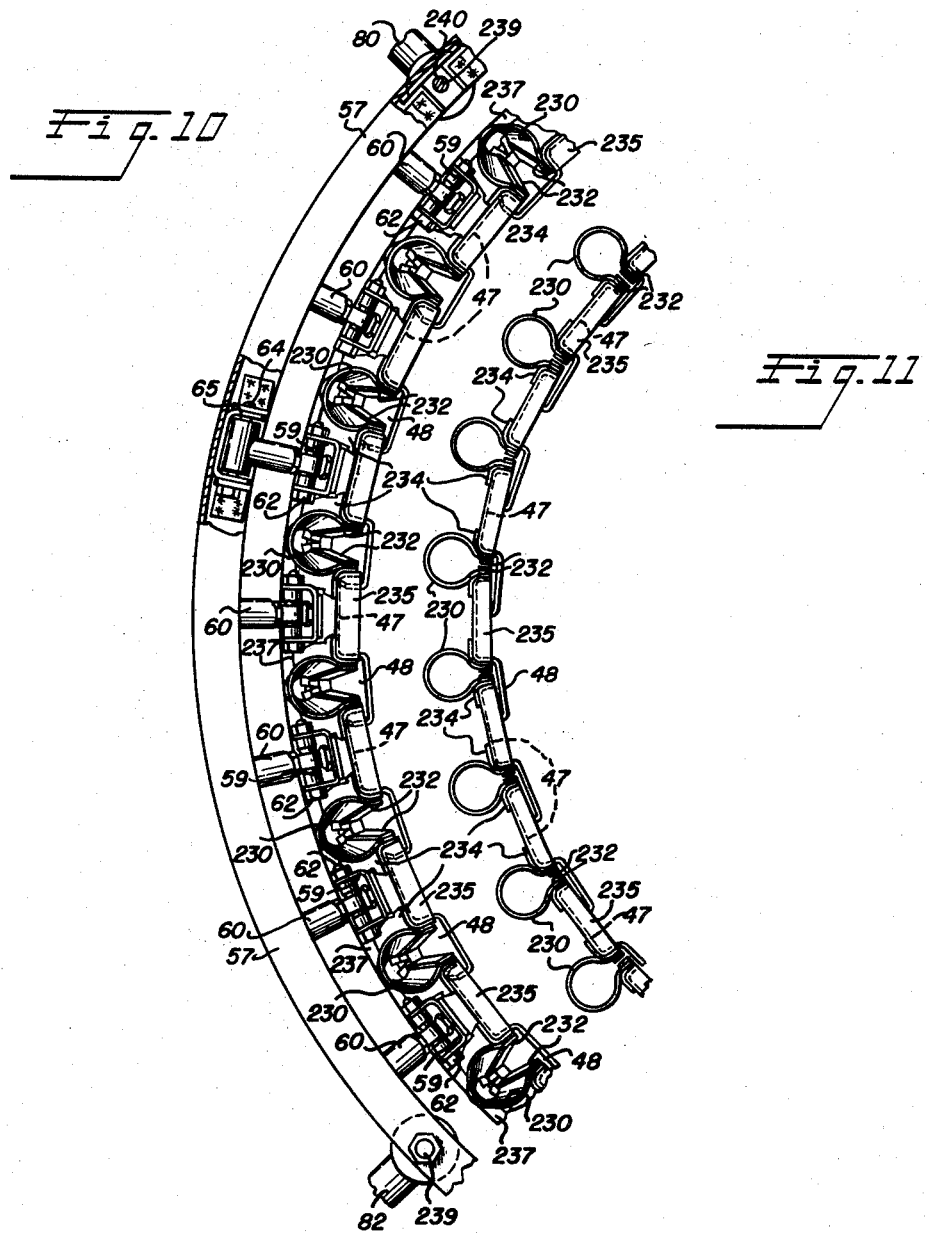
INVENTOR
Ralph Kress
BY Strauch, Nolan & Diggins
ATTORNEYS Dec. 23, 1958  R. KRESS  2,865,165
VARIABLE NOZZLE FOR JET ENGINE
Filed March 17, 1950  10 Sheets-Sheet 5
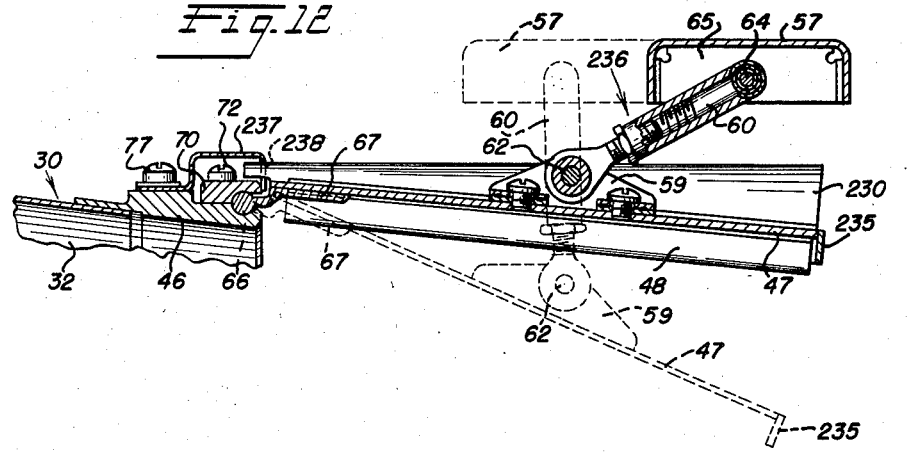
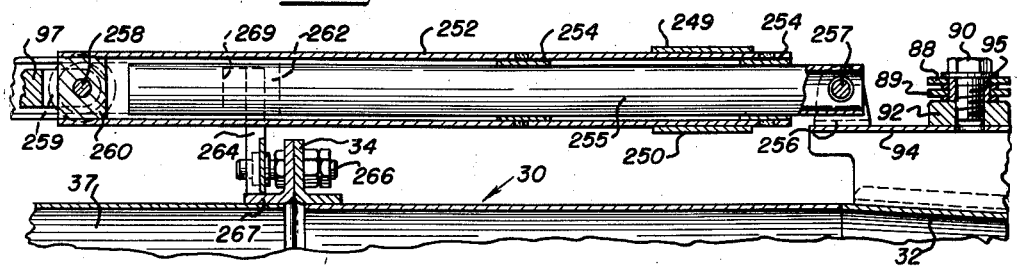
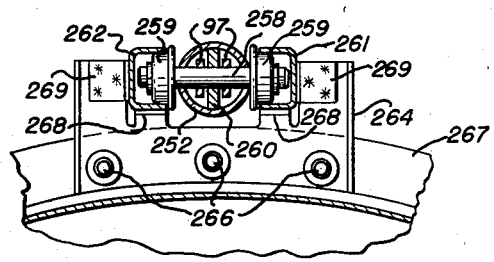
INVENTOR
Ralph Kress
BY *Strauch, Nolan & Diggins*
ATTORNEYS

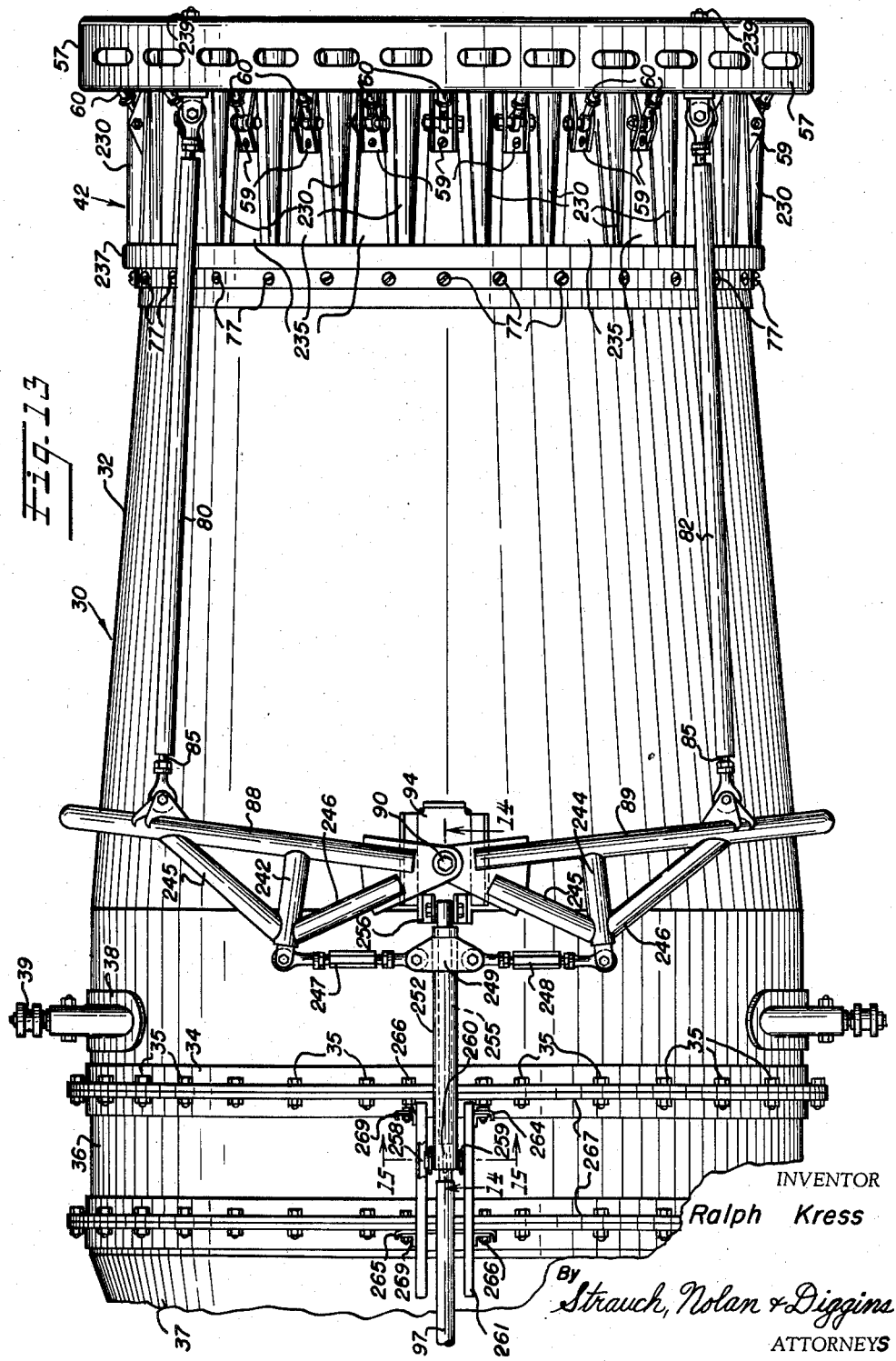

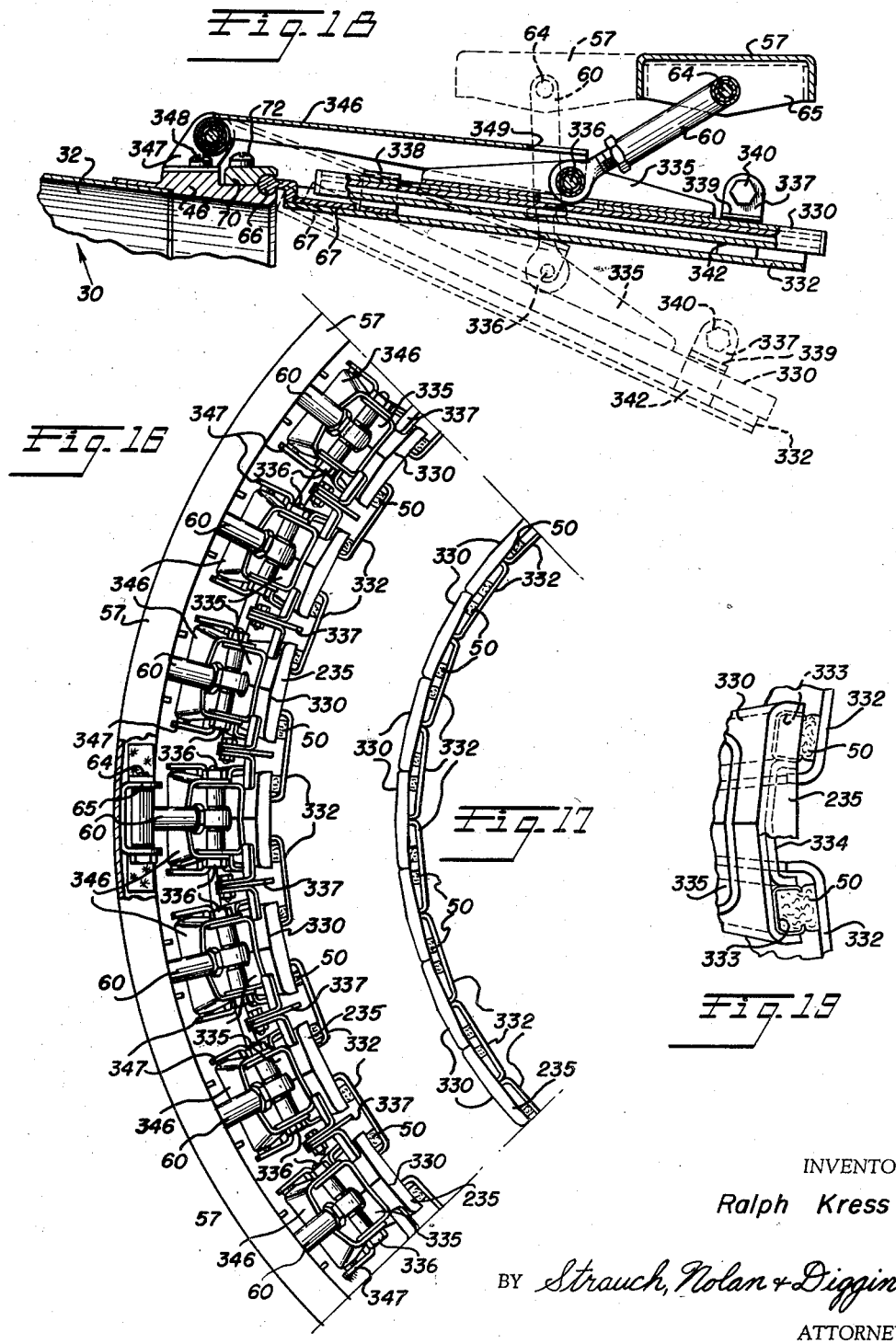

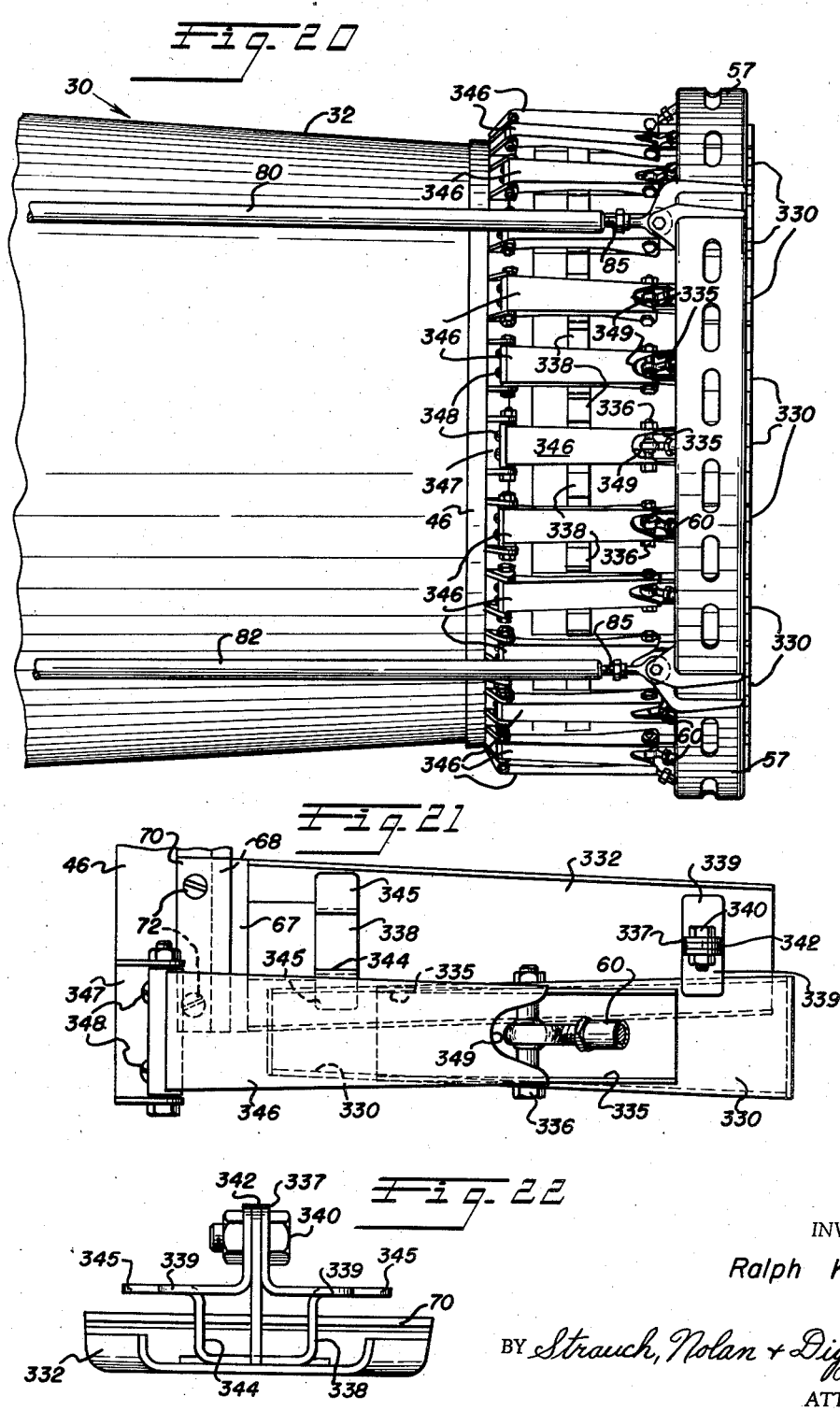

Dec. 23, 1958 R. KRESS 2,865,165
VARIABLE NOZZLE FOR JET ENGINE
Filed March 17, 1950 10 Sheets-Sheet 9
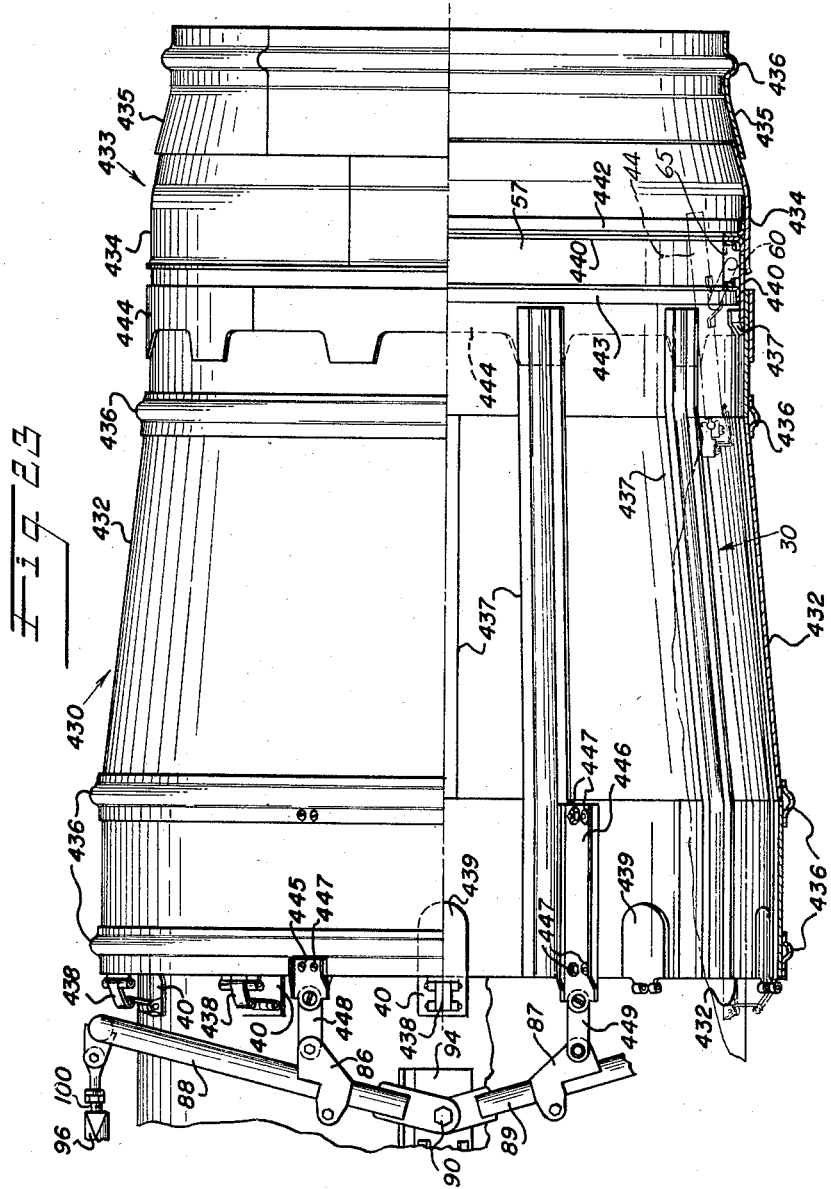
INVENTOR
Ralph Kress
BY Strauch, Nolan & Diggins
ATTORNEYS

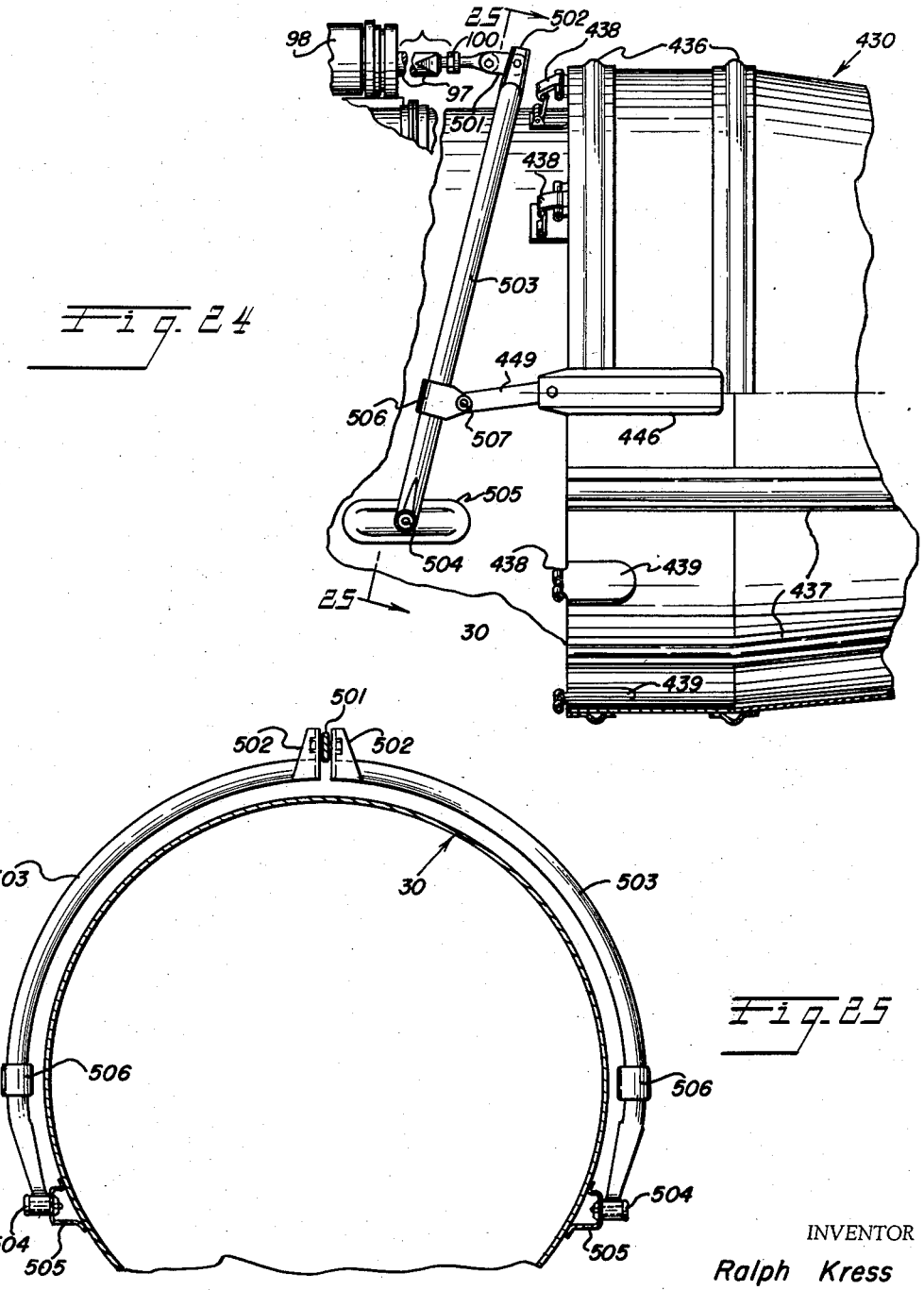

United States Patent Office 2,865,165
Patented Dec. 23, 1958

2,865,165

VARIABLE NOZZLE FOR JET ENGINE

Ralph Kress, La Mesa, Calif., assignor to Solar Aircraft Company, San Diego, Calif., a corporation of California Application March 17, 1950, Serial No. 150,127

4 Claims. (Cl. 60—35.6)

This invention relates to jet power plants and has particular reference to continuously variable jet engine nozzles.

In the course of recent widespread development of jet type engines and power plants it soon became apparent that the single position or non-variable exhaust nozzle of the early jet engine did not allow for satisfactory engine performance over the wide and rapidly varying range of operating conditions encountered in jet plane operation. In prior efforts to solve these problems the nozzle areas of conventional jet engines have been varied by utilizing either moving tail cones and fixed shrouds or fixed tail cones and moving shrouds. Such devices have been subject to mechanical difficulties under the high operating temperatures due to binding and galling of relatively movable parts which seriously affect the efficiency and safety of jet plane operation, particularly in military maneuvers.

This problem became even more acute with the advent of the jet engine afterburner provided in jet powered aircraft to augment the thrust of the primary burner, since the prior cone-type variable nozzles do not provide sufficient nozzle variation for effective afterburner operation. This has led to the provision of two-position jet nozzles in afterburner equipped jet engines. These two-position nozzles present a relatively small opening when the afterburner is not in operation, and a considerably larger opening when the afterburner is in operation, and have proved to be a substantial improvement over the earlier fixed area or non-variable nozzle.

However, while the two-position nozzle has enabled the successful use of afterburners, it has not entirely eliminated the problems of the fixed area nozzle, because the two-position nozzle has no provision for intermediate adjustment between its small opening or closed position and its larger opening or open position. This means that when the afterburner is not in use the nozzle must be maintained in closed position to avoid the loss of thrust that would occur if it were in its open position with no afterburning. Therefore, when the afterburner is not in use and the nozzle remains in its closed position there still is no compensation for the wide range of operating conditions encountered by an aircraft during normal non-afterburning flight due to variations in air speed, altitude and engine R. P. M., and to many other factors. This is a material disadvantage of the two-position nozzle since the afterburner, which consumes a tremendous amount of fuel, is only used infrequently to supplement the primary burner which means that the nozzle must remain in a closed position most of the time.

In an effort to overcome the foregoing disadvantages of the prior variable and two-position nozzles considerable development has been carried forward with jet nozzles having orifices which may be varied to any desired size between fully closed and fully open positions. Such variable nozzles have been principally of the "eyelid" or "clam shell" type, having spherically surfaces, variably positioned "eyelids" or gates. However, use of this type of nozzle has created new problems making their value for practical purposes highly questionable. In the first place, it is extremely difficult to produce spherical surfaces within the tolerances required for good sealing in such nozzles under operating conditions without having binding between open and closed positions. This situation is aggravated during afterburning because differential expansions may easily distort the comparatively large spherical surfaces, and in each successive use of the afterburner the surfaces get further and further out of round until the nozzle sticks and ceases to function as a continuously variable nozzle, with possible serious resultant consequences to plane and crew in flight. Also, it has been found that in this type of nozzle the non-planar shape of the outer surface of the nozzle in open position is less efficient than the round orifices previously used in the non-variable and the needle valve types, and in some positions of the two-position nozzles. In addition, tests have shown that sliding connections of all sorts give difficulty when exposed to the extremely high temperatures present in jet engines.

To overcome these disadvantages of the jet nozzles of the prior art, this invention provides a continuously variable nozzle embodying a novel flap structure which enables efficient and dependable jet engine operation throughout any range of operating conditions. In the disclosed embodiments, described more fully hereinafter, the variation in size of nozzle orifice is made possible by a plurality of interlocking flap or channel elements which not only provide for smoothly continuous size variation but allow the orifice to retain its original circular shape regardless of its size. In addition, the individual elements comprising the variable nozzle structure are each sufficiently small so that no harmful overall distortion can take place, and sufficiently well-sealed so there is no loss of motive force due to lateral thrust.

With these and other considerations in view it is a prime object of this invention to provide a continuously variable jet nozzle which allows for top jet engine performance over a wide range of operating conditions.

It is a further important object of this invention to provide a continuously variable jet nozzle in which the variations in the size of nozzle orifice take place smoothly and evenly.

Another important object is to provide a continuously variable jet nozzle which will not be distorted or cause binding because of high jet exhaust temperature.

A further object is to provide a continuously variable jet nozzle in which the orifice retains a circular shape regardless of its size.

A still further object is to provide a continuously variable jet nozzle having a sealing means which for any position of the nozzle prevents loss of motive force due to lateral thrust.

Another object is to provide a continuously variable jet nozzle which can be operated quickly and reliably in response to control signals.

A still further object is to provide in a widely variable nozzle, a planar orifice.

Other objects and advantages will be apparent from the following description in conjunction with the accompanying drawings and from the appended claims.

The accompanying drawings, in which like reference numerals are used to designate similar parts throughout, illustrate the preferred embodiments for the purpose of disclosing the invention. The drawings, however, are not to be taken in a limiting or restrictive sense, since it will be apparent to those skilled in the art that various changes in the illustrated constructions may be resorted to without in any way exceeding the scope of the invention.

In the drawings:

Figure 1 is a side elevation of one form of continuously variable jet nozzle embodying the invention;

Figure 2 is a detailed section of the push rod toggle mechanism taken along line 2—2 of Figure 1;

Figure 3 is a quarter section of an end elevation of the continuously variable nozzle of Figure 1, shown with the nozzle in full open position;

Figure 4 is a quarter section of a view of the ends of the channels of Figure 3, shown in closed position;

Figure 5 is a detailed perspective of two interlocking channels in the continuously variable nozzle of Figure 1, showing the inter-channel sealing means;

Figure 6 is a detailed side elevation of a channel of Figure 1, showing channel hinging, sealing and actuating means;

Figure 7 is a partial side elevation of an annular hinge supporting casting mounted upon the after end of the tail pipe of the nozzle of Figure 1;

Figure 8 is a partial end elevation of the annular casting of Figure 7;

Figure 9 is a detailed segment of the channel hinge sealing means for the nozzle of the Figure 1;

Figure 10 is a quarter section of an end elevation of a second form of continuously variable jet nozzle embodying the invention, shown with the nozzle in full open position;

Figure 11 is a quarter section of a view of the ends of the channels and sealing strips of Figure 10, shown with the nozzle in closed position;

Figure 12 is a detailed side elevation of a channel of Figure 10, showing channel hinging sealing and actuating means;

Figure 13 is a side elevation of the continuously variable jet nozzle of Figure 10;

Figure 14 is a detailed section of the push rod toggle mechanism taken along line 14—14 of Figure 13;

Figure 15 is a detailed section of a part of the toggle-piston rod linkage taken along line 15—15 of Figure 13;

Figure 16 is a quarter section of an end elevation of a third form of continuously variable jet nozzle embodying the invention, shown with the nozzle in full open position;

Figure 17 is a quarter section of a view of the ends of the channels and sealing strips of Figure 16, shown with the nozzle in closed position;

Figure 18 is a detailed side elevation of a channel of Figure 16, showing channel hinging, stabilizing and actuating means;

Figure 19 is a detailed perspective of three interlocking channels, showing the channel sealing means;

Figure 20 is a side elevation of the continuously variable jet nozzle of Figure 16;

Figure 21 is a plan view of two interlocking channels showing channel clips and stabilizing assembly;

Figure 22 is an end elevation of an outwardly facing channel showing channel clip details;

Figure 23 is a side elevation of a fourth form of continuously variable jet nozzle embodying the invention showing the outer cooling shroud used as an actuating ring;

Figure 24 is a modification of the shroud actuating mechanism illustrated in Figure 23; and Figure 25 is a fragmental side view taken along line 25—25 of Figure 24.

Figure 1 illustrates a jet engine tail pipe generally indicated at 30 having an inwardly tapered section 32 at its after end and a flange 34 secured to its forward end. Flange 34 is fastened by conventional means such as bolts 35 to a shell section 36 which normally houses the afterburner, not shown. The forward end of the shell section 36 may be secured to the after end of a diffuser 37 which in turn is secured to the after portion, not shown, of the jet engine discharge duct. Mounted on the tailpipe 30 at its center of gravity, in diametrically opposite positions are two engine support brackets 38, only one of which is shown, having trunnions 39 integral therewith. Brackets 38 and trunnions 39 allow the engine to be mounted in the vehicle in such a way that it may be easily removed and repaired or replaced. Also mounted on tailpipe 30 are the radially spaced shroud hinge brackets 40 provided so that a cooling shroud such as that shown in Figure 23 may be hinged to the tailpipe.

The variable area nozzle generally indicated at 42 is mounted on the after end of tailpipe 30. This nozzle is comprised of 28 interlocking flaps or S-shaped channel elements 44, each hinged in a manner to be hereinafter described to an annular casting 46 welded to the after end of the inwardly tapered section 32. As is most clearly shown in Figures 3 and 5 each of the interlocking S-shaped channel elements 44 comprises an inwardly facing channel 47 and an outwardly facing channel 48. These channels 47 and 48 are formed so that the sides 49 of each channel converge toward the after end of the channel, whereby the channels are wider at their forward or hinged ends than at their after ends as is most clearly illustrated in Figure 5. This channel formation allows all the channel elements 44 to be simultaneously swung inwardly to decrease the size of the nozzle orifice, or swung outwardly to increase the size of the nozzle orifice, while at the same time maintaining a substantially circular orifice for any channel position. Figure 3 shows the relative positions of the interlocking channel elements 44 in their outermost or fully opened orifice position, while Figure 4 shows the relative positions of the channel elements in their innermost or fully closed orifice positions.

To avoid loss of thrust due to exhaust gases escaping laterally or radially from nozzle 42 sealing means comprising strips of sealing material 50 are provided between each of the adjacent interlocking channels 44. The sealing strips 50 may be of any suitable sealing material such as Inconel braid, and, as is best shown in Figures 3 and 5, are secured to each of the outwardly facing channels 48 by means of sealing strip holders 52, Figure 5. Holders 52 are comprised of a thin holding channel 54 welded at one side 55 to channel wall 49 so that a narrow space is left between holding channel 54 and the bottom of channel 48, as is best shown in Figure 4, and an L-shaped strip 56 welded to channel 54 to form the holders 52. Since the internal pressure of the nozzle exerts an outward force against the thin holding channels 54, the sealing strips 50 will be held tightly against the adjacent inwardly facing channels 47 to maintain a substantially gas tight seal.

The positioning of the interlocking channels 44 is controlled through the annular channel actuating ring 57, Figures 1, 3 and 6. Secured to the back 58 of each of the inwardly facing channels 47 is a hinge bracket 59 to which is hinged one end of a toggle arm 60 by means of a hinge pin 62. The toggle arms 60 are hinged at their other ends by means of hinge pins 64 to hinge brackets 65 fixed at radially spaced intervals about the inner surface of the actuating ring 57. Because of this toggle arm arrangement between actuating ring 57 and each of the interlocking channel elements 44 motion imparted to the ring 57 in an axial direction, Figure 1, will be transmitted to channel elements 44 to cause them to swing inwardly or outwardly. This relationship is best shown in Figure 6 which shows in solid lines the relative positions of ring 57 and the channel element 44 when the variable nozzle 42 is in its fully opened position, and shows in dotted lines the relative positions of ring 57 and the channel element 44 when variable nozzle 42 is in its fully closed position. Thus, it will be seen that movement of the ring 57 towards the after end of tailpipe 30 causes variable nozzle 42 to open, while movement of ring 57 in the reverse direction causes the nozzle to close.

Still referring to Figure 6, it will be seen that the channel elements 44 are hinged to the after end of tailpipe 30 by means of hinge pins 66 integral with a hinge strip 67 welded to the bottom of each outwardly facing channel 48. Pins 66 rotate in sockets formed by grooves 68 in annular casting 46 and grooves 69 in cover pieces 70 secured to casting 46 by some means such as bolts 72. In order that pins 66 can rotate in the sockets, the annular casting 46 is formed with 28 flat portions 73 about the after end of its periphery, each flattened portion 73 having a groove 68 therein, as is best illustrated in Figures 7 and 8. While the illustrated hinging means forms a reasonably good seal, a further precaution against possible loss of thrust through the channel hinges is provided in the form of two overlapping spring steel strips 74 and 75 extending completely around the periphery of annular casting 46. Strips 74 and 75 are formed so that their after edges spring inwardly against the backs of the inwardly facing channels, Figures 1 and 6, and are secured at their forward edges to annular casting 46 by means of an annular ring 76 which fits over the strips and is secured in place by some suitable means such as bolts 77. Strips 74 and 75 are provided with slots 78 to increase their spring action and are arranged so that their respective slots are staggered as is best shown in Figure 9 which shows a fragmentary section of the strips with a part of top strip 74 broken away.

The channel actuating ring 57, Figure 1, is moved in the horizontal or axial direction by means of four push rods, two of which are shown at 80 and 82, loosely connected at their after ends to brackets 84 mounted on ring 57. Rods 80 and 82 are provided at either end with suitable adjusting means such as turnbuckles 85. The forward ends of rods 82 and 84 are loosely connected to rearwardly extending ears 86 and 87, rigidly mounted on two semi-circular rods 88 and 89, respectively. The ends of rods 88 and 89 are pivoted on two diametrically opposite pivot posts 90, only one of which is shown. Posts 90 are threaded into a boss 92, Figure 2, on a plate 94 welded to tailpipe 30 and are encased in bushings 95. Upper semi-circular rod 88 is loosely connected at its topmost point to a rod 96 which is linked by conventional means to the extended piston rod 97 of a fluid motor or actuator 98. Similarly, lower semi-circular rod 89 is connected at its lowermost point to a rod 99 linked to a similar fluid motor actuator, not shown. Rods 96 and 99 are provided with suitable adjusting means such as turnbuckles 100. It will be understood that control signals delivered by any suitable means to the fluid motors 98 will be transmitted through the linkages described to cause forward or backward movement of ring 57 in an axial direction.

In order to insure uniform movement in all parts of the actuating ring 57, rods 88 and 89 are linked together by means of two diametrically opposite toggle assemblies, only one of which is shown in Figure 1, generally indicated at 101. Integral with rods 88 and 89 are the two forwardly extending ears 102 and 104 to which the toggle links 105 and 106, respectively, are loosely connected. Links 105 and 106, which are also provided with adjusting means such as turnbuckles 107, are loosely fastened at their forward ends to a pair of plates 108 and 109, Figures 1 and 2. Plates 108 and 109 are secured to each other and to a tube 110 by some means such as bolts 112. Tube 110 is provided with bearing rings or bushings 114 and 115 and is mounted for slidable movement on the tube 116 which is provided with slots 117 for the bolts 112. Tube 116 is held in a fixed position at its after end by a pin 118 which passes through the tube and a bracket 119 welded to plate 94, and at its forward end by a plate 120 welded to tube 116 and secured to flange 34 by some means such as bolts 122, Figure 1.

Figures 10 through 15, inclusive, show a second form of the invention embodied herein having a modified channel sealing means, hinge sealing means and channel actuating ring control linkage. Figures 10 and 11, corresponding to Figures 3 and 4, illustrate the relative position of channel elements 44 when the variable nozzle 42 is in its fully opened and fully closed positions, respectively. In this form of the invention the thin spring steel strips 230 replace the sealing strips 50 as a channel sealing means to prevent loss of thrust in a radial direction. Sealing strips 230 run the length of the channel, as is best illustrated in Figure 10, and are reinforced at their bottom edges by means of strips 232. The strips 232 and bottom edges of strips 230 are welded to the attaching angles 234, which are in turn welded to adjacent inwardly facing channels 47 as shown.

It will be understood that sealing strips 230 possess sufficient spring to allow substantially free movement of channel elements 44 while at the same time serving satisfactorily as a seal between them. The inwardly facing channels 47 of Figure 10 are also provided with end pieces 235 at their after ends which serve to make the periphery of the end of the nozzle orifice somewhat more regular in the full open position than in the form shown in Figure 3. Outwardly facing channels 48 shield and protect sealing strips 230 from the direct blast of the hot gases.

Figure 12 which corresponds roughly with Figure 6 shows the same channel element hinging means described hereinbefore. However, in Figure 12 the hinge strips 67 are welded to the inwardly facing channels 47 of the channel elements 44 rather than to the outwardly facing channel elements 48 as shown in Figure 6, and the toggle arms 60 are provided with a suitable adjusting means 236 as shown. A modified hinge sealing means is also shown in Figure 12 which comprises an annular channel shaped ring 237 which is formed to fit over the hinge assembly as shown, and is secured to annular casting 46 by means of the bolts 77. Channel ring 237 is provided with semi-circular cut out portions 238 to allow the forward ends of the sealing strips 230 to extend therethrough. As in the first form of the invention axial movement of ring 57 towards the end of tailpipe 30 causes variable nozzle 42 to open, while movement of ring 57 in the reverse direction causes the nozzle to close.

Figures 13, 14 and 15 illustrate the modified channel actuating ring linkage. In Figure 13 which corresponds with Figure 1, the push-rods 80 and 82 are secured to actuating rings 57 by means of bolts 239 which pass through brackets 240, Figure 10, welded to the inside of the ring. The semi-circular rods 88 and 89 in this form of the invention are provided with forwardly extending arms 242 and 244, each reinforced by means of rods 245 and 246 as shown. Loosely connected to the forward ends of arms 242 and 244 are the adjustable toggle links 247 and 248, respectively. Toggle links 247 and 248 are loosely fastened at their other ends to two plates 249 and 250, Figures 13 and 14, secured on opposite sides of a tube 252. Tube 252, which has suitable bearing rings or bushings 254 force fitted within it as shown, is mounted for slidable movement in the axial direction on a rod 255 secured at its after end to the bracket 256 integral with plate 94. As is best shown in Figure 14 the rod 255 which supports and guides the after end of tube 252 extends only part way into the tube. The forward end of tube 252 is supported and guided for sliding movement by means of a horizontal rotatable axle 258 which passes through the tube and has a roller 259 on each end. The axle 258 also passes through a stud 260, Figures 14 and 15, vertically mounted in tube 252 which acts as a bearing to allow free rotation of the axle. Rollers 259 ride in two tracks or channels 261 and 262, most clearly illustrated in Figures 13, 14 and 15. The tracks 261 and 262 are supported by means of two brackets 264 and 265 secured by some means such as bolts 266 to the flanges 267 of the shell 36. Brackets 264 and 265 are formed with turned down ears 268, Figure 15, on which tracks 261 and 262 rest, the tracks being secured to the brackets by means of the angle members 269 welded to the tracks and brackets as shown in Figure 15. As is best shown in Figures 13 and 15 the forward end of the extended piston rod 97 is formed with a yoke which straddles the stud 260 and is loosely held in position by the axle 258. The piston rod 97 forms a part of a fluid motor such as that illustrated at 98 in Figure 1, not shown in Figure 13. As disclosed in connection with the first form of the embodied invention, control signals received by the fluid motor will be transmitted through the linkage described to control the position of actuating ring 57 and variable nozzle 42.

Figures 16 through 22, inclusive, show a third form of the invention embodied herein having a modified channel structure. Referring to Figure 16 it will be seen that in this form of the invention the 28 interlocking S-shaped channel elements 44 of Figures 1 and 13 have been replaced by 28 inwardly facing channels 330 and 28 outwardly facing channels 332, the inwardly and outwardly facing channels being interlocking and alternately arranged as shown in Figures 16 and 17. Figure 16 illustrates the relative positions of channels 330 and 332 when the variable nozzle 42 is in its fully opened position, while Figure 17 illustrates the variable nozzle 42 in its fully closed position. With this channel structure two sealing strips 50 such as those described with reference to Figures 3, 4 and 5, are provided for each inwardly facing channel 330; these strips run the length of the channels and are gripped by thin sealing strip holders 333, Figure 19, which are held in place against the channel sides by means of the inner channel members 334. During operation of the jet engine the exhaust gas pressure against the backs of outwardly facing channels 332 forces those channels tightly against the sealing strip 50 to effectively seal the variable nozzle.

The channel hinging assembly, Figure 18, in this form of the invention is the same as that provided for the other embodiments except that only the outwardly facing channels 332 are hinged, the hinge strip 67 being welded to the bottom of the inside of each of the channels 332 as shown. The inwardly facing channels 330, which are not hinged, are connected to the channel actuating ring 57 by means of the toggle arms 60 as hereinbefore described. Toggle arms 60 are pivotally secured to the channels 330 by means of U-shaped brackets 335 mounted on the backs of the channels and pins 336 which pass through the brackets and toggle arms. In order that the motion transmitted to the inwardly facing channels 330 by actuating ring 57 may also be transmitted to the outwardly facing channels 332, the latter are provided with clips 337 and 338 which link the two sets of channels together. As is most clearly illustrated in Figures 21 and 22 the clips 337 are welded to the bottoms of channels 332 at their after ends and are comprised of two horizontal arms 339 fastened by suitable means such as a bolt 340 to an upstanding member 342. The arms 339 overlie the adjacent inwardly facing channels 330 as shown in Figures 16 and 21. Clips 338 are welded to the bottoms of channels 332 at their forward ends and are comprised of a single U-shaped member 344, the upstanding sides of which are turned outwardly to form horizontal ears 345 which also overlie the adjacent inwardly facing channels 330 as shown in Figure 21. It will be understood, therefore, that because of the clips 337 and 338 any movement of channels 330 will cause hinged channels 332 to be similarly moved.

Because the inwardly facing channels 330 are not hinged to the tailpipe 30 some means must be provided so that axial motion of the channel actuating ring 57 will cause inwardly or outwardly swinging action of channels 330 rather than back and forth sliding in the axial direction, see Figure 18. This is accomplished by providing a stabilizing assembly for each inwardly facing channel 330 comprising a channel shaped stabilizer 346 hinged at its forward end to the stabilizer bracket 347 and hinged at its after end to the channel bracket 335. The brackets 347 are secured to the annular casting 46 by any suitable means such as bolts 348. As is best seen in Figures 20 and 21 stabilizer 346 is cut away at 349 to allow toggle arms 60 to move freely back and forth in a vertical plane.

The push rods 80 and 82 which transmit movement to the channel actuating ring 57, Figure 20, may be linked to fluid motors either through the linkage illustrated in Figure 1 or the linkage illustrated in Figure 13, both described hereinbefore.

Figure 23 shows partly in section a fourth form of the invention similar to the form illustrated in Figures 1 through 9, inclusive, wherein the channel actuating ring 57 is moved back and forth in the axial direction by means of the cooling shroud assembly, generally indicated at 430. The cooling shroud assembly is comprised of the main shell 432 and a tail assembly generally indicated at 433 which in turn is comprised of a forward tail section 434 and an after tail section 435. The shroud assembly 430 is reinforced by means of annular stiffening bands or hat sections 436 about the outer surface of the assembly and by lengthwise stiffening bands 437 along the inner surface of the assembly. The shroud assembly 430 is hinged at its forward end to the tailpipe 30 by means of the two piece hinge assemblies 438 which allow the shroud assembly to be moved back and forth in the axial direction. Hinge assemblies 438 are hinged at one side to the hinge bracket 40 mounted on tailpipe 30, and at the other side to hinge bracket 439 mounted on the main shell 432 of the shroud assembly.

The channel actuating ring 57 is mounted at the after end of the main shell 432 and is formed by an L-section annular ring 440 and two annular reinforcing angles 442 and 443. Spaced radially about the inner surface of ring 57 are the hinge brackets 65, on which the toggle arms 60, Figures 1 and 3, are pivoted. Toggle arms 60 are hinged at their other ends to channel elements 44 so that motion of the ring 57 is transmitted to the channel elements as described hereinbefore in connection with Figures 1 through 9, inclusive. The shroud assembly 430 is assembled by partially inserting annular ring 440 in the after end of the main shell 432 and securing it in place by some suitable means such as by welding. A reinforcing band 444 is then fitted over the joint on the outside of main shell 432, as shown, and welded or otherwise fastened thereto. The after tail section 435 is secured as by welding in a partially overlapping fashion to the forward tail section 434 which in turn is slipped over the annular ring 440 and welded or fastened in place.

Mounted on the forward end of the shroud assembly 430 are four brackets, two of which are shown at 445 and 446, which are secured to the main shell 432 by any conventional means such as bolts 447. Brackets 445 and 446 are linked to the rearwardly extending ears 86 and 87, respectively, by means of the connecting links 448 and 449. As explained hereinbefore in connection with Figure 1 the rearwardly extending ears 86 and 87 are rigidly mounted on the two semi-circular rods 88 and 89 which in turn are linked to two actuators or fluid motors 98, not shown. It will be understood, therefore, that shroud assembly 430 will be moved in the axial direction in response to the movement of the fluid motors and that channel actuating ring 57 integral with the shroud assembly will likewise be moved to actuate the channel elements 44 of the variable nozzle as hereinbefore described.

In the embodiment of the invention illustrated in Figures 24 and 25, the form of invention shown in Figure 23 is modified to utilize an improved simplified actuating mechanism having a single actuating cylinder or motor 98 which replaces the two actuating cylinders for the shroud 430 of Figure 23. In this embodiment, piston rod 97 is connected through turnbuckle 100 and pivoted link 501 to tabs 502 of the operating yoke 503. The lower ends of yoke 503 are pivotally mounted on opposite sides of shell 30 through brackets 505 mounted on the cylindrical portion of the shell 30. Integrally welded to yoke 503 at subsequently diametrically opposite points are brackets 506 to which the outer ends of a pair of actuating links 449 are pivotally connected by pins 507.

In operation of this embodiment, as piston rod 97 is shifted by actuator 98, turnbuckle 100 and link 501 shift the yoke 503 about pivot pins 504. Bracket 506 and pins 507 shift shroud 430 axially to open or close the variable nozzle 42, depending upon the direction of movement of the shroud in the manner set forth in connection with the embodiment shown in Figure 23.

It will be seen from the foregoing that the invention embodied herein provides a continuously variable nozzle which enables efficient and dependable jet engine performance throughout any range of rapidly changing operating conditions. The nozzle may be continuously varied in size to any position from its fully closed to its fully open position maintaining at all times a nozzle orifice substantially circular in shape. It is relatively free from over-all distortion since the component parts comprising the nozzle are uniformly small, and the component parts are sufficiently well sealed so that there is substantially no loss of motive force due to gases escaping laterally through the nozzle. Thus, a continuously variable nozzle is provided which is more dependable and enables greater jet engine efficiency than the nozzles of the prior art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. In a variable area nozzle; a fixed member; and a plurality of slidably interlocked alternately arranged inwardly facing and outwardly facing channels forming a circular nozzle orifice, said outwardly facing channels being swingably connected to said fixed member; whereby swinging said interlocked channels in unison towards or away from the center of said nozzle orifice respectively causes the size of the orifice to decrease or increase, the shape of the orifice remaining circular for any size of the orifice.

2. In a jet engine; a variable area jet nozzle; and a single actuating means for said jet nozzle; said jet nozzle being comprised of a plurality of slidably interlocked alternately arranged inwardly facing and outwardly facing channels forming a circular nozzle orifice, said outwardly facing channels being swingably connected to the after end of said jet engine and said inwardly facing channels being operably connected to said actuating means; whereby movement of said actuating means in one direction actuates said interlocked channels to positively increase the area of said variable area nozzle, and movement of said actuating means in the reverse direction actuates said interlocked channels to decrease the size of said variable area nozzle.

3. In a jet engine; a variable area jet nozzle; a single actuating means for said jet nozzle; said jet nozzle being comprised of a plurality of slidably interlocked alternately arranged inwardly facing and outwardly facing channels forming a circular nozzle orifice and having converging side walls causing said channels to be narrower at their after ends than at their forward ends, said outwardly facing channels being swingably connected to the after end of said jet engine and said inwardly facing channels being operably connected to said actuating means; whereby movement of said actuating means in one direction actuates said interlocked channels to increase the area of said variable area nozzle, and movement of said actuating means in the reverse direction actuates said interlocked channels to decrease the size of said area nozzle.

4. In a jet engine; a variable area jet nozzle; a single actuating means for said jet nozzle; said jet nozzle being comprised of a plurality of alternately arranged inwardly facing and outwardly facing channels forming a circular nozzle orifice, a plurality of clips secured to the outwardly facing channels having members overlying the adjacent inwardly facing channels to interlock the inwardly and outwardly facing channels, said outwardly facing channels being swingably connected to the after end of said jet engine and said inwardly facing channels being operably connected to said actuating means; whereby movement of said actuating means in one direction actuates said interlocked channels to increase the area of said variable area nozzle, and movement of said actuating means in the reverse direction actuates said interlocked channels to decrease the size of said variable area nozzle.

References Cited in the file of this patent

UNITED STATES PATENTS

| | | |
|---|---|---|
| 157,526 | Leggett | Dec. 8, 1874 |
| 157,527 | Leggett | Dec. 8, 1874 |
| 186,310 | Curtis | Jan. 16, 1877 |
| 851,603 | Long | Apr. 23, 1907 |
| 1,120,535 | Pruden | Dec. 8, 1914 |
| 1,985,014 | Bush | Dec. 18, 1934 |
| 2,094,707 | Jones | Oct. 5, 1937 |
| 2,462,953 | Eaton | Mar. 1, 1949 |
| 2,563,270 | Price | Aug. 7, 1951 |
| 2,579,043 | Kallal | Dec. 18, 1951 |
| 2,603,062 | Weiler et al. | July 15, 1952 |
| 2,634,578 | Kallal | Apr. 14, 1953 |

FOREIGN PATENTS

| | | |
|---|---|---|
| 586,571 | Great Britain | Mar. 24, 1947 |
| 607,686 | Great Britain | Sept. 3, 1948 |
| 756,632 | France | Sept. 25, 1933 |
| 335,939 | Italy | Feb. 11, 1936 |